(12) United States Patent
Edara

(10) Patent No.: US 9,402,227 B2
(45) Date of Patent: *Jul. 26, 2016

(54) REDUCING SERVICE ACQUISITION TIME WHEN A USER DEVICE IS POWERED UP

(71) Applicant: AMAZON TECHNOLOGIES, INC., Reno, NV (US)

(72) Inventor: Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/452,355

(22) Filed: Aug. 5, 2014

(65) Prior Publication Data

US 2014/0357271 A1 Dec. 4, 2014

Related U.S. Application Data

(63) Continuation of application No. 13/246,832, filed on Sep. 27, 2011, now Pat. No. 8,838,098.

(51) Int. Cl.
| | |
|---|---|
| *H04W 4/00* | (2009.01) |
| *H04W 48/16* | (2009.01) |
| *H04W 52/02* | (2009.01) |
| *H04W 64/00* | (2009.01) |

(Continued)

(52) U.S. Cl.
CPC .......... *H04W 48/16* (2013.01); *H04W 52/0254* (2013.01); *H04W 64/00* (2013.01); *H04W 36/32* (2013.01); *H04W 48/18* (2013.01); *H04W 84/042* (2013.01); *Y02B 60/50* (2013.01)

(58) Field of Classification Search
CPC ... H04W 84/042; H04W 24/00; H04W 36/00; H04W 36/08; H04W 48/20; H04W 52/0216; H04W 52/0219; H04W 76/02; H04W 84/18; H04W 52/0254; H04W 36/32; H04W 48/16; H04W 48/18; H04W 64/00; H04W 36/0066
USPC ................................................ 455/432.1–434
See application file for complete search history.

(56) References Cited

U.S. PATENT DOCUMENTS

| | | | |
|---|---|---|---|
| 6,002,930 A | 12/1999 | Sadrozinski et al. | |
| 6,223,042 B1 * | 4/2001 | Raffel ................... | H04W 48/16 455/161.1 |

(Continued)

FOREIGN PATENT DOCUMENTS

| | | |
|---|---|---|
| EP | 1 703 756 A1 | 9/2006 |
| EP | 1 858 278 A1 | 11/2007 |
| WO | WO 99/01001 A1 | 1/1999 |

OTHER PUBLICATIONS

International Search Report for International Application No. PCT/US2012/057318 mailed Jan. 23, 2013.

(Continued)

*Primary Examiner* — Ronald Eisner
(74) *Attorney, Agent, or Firm* — Lowenstein Sandler LLP

(57) ABSTRACT

A user device receives network information for a future destination of the user device. The user device stores the network information for the future destination in a local store of the user device. Responsive to the user device starting up, the user device searches for an available network using the network information in the local store of the user device, wherein searching for the available network excludes searching for a last registered network.

20 Claims, 8 Drawing Sheets

(51) Int. Cl.
*H04W 36/32* (2009.01)
*H04W 48/18* (2009.01)
*H04W 84/04* (2009.01)

(56) References Cited

U.S. PATENT DOCUMENTS

| | | |
|---|---|---|
| 2002/0029108 A1 | 3/2002 | Liu et al. |
| 2007/0259646 A1 | 11/2007 | Hu et al. |
| 2009/0112461 A1 | 4/2009 | Murphy |
| 2010/0146561 A1 | 6/2010 | Jiang et al. |
| 2010/0211442 A1 | 8/2010 | Venkataraman et al. |
| 2012/0188106 A1 | 7/2012 | Frome |

OTHER PUBLICATIONS

Written Opinion for International Application No. PCT/US2012/057318 mailed Mar. 27, 2014.

* cited by examiner

REDUCING SERVICE ACQUISITION TIME WHEN A USER DEVICE IS POWERED UP

RELATED APPLICATIONS

This application is a Continuation of U.S. patent application Ser. No. 13/246,832, filed Sep. 27, 2011, which is herein incorporated by reference.

BACKGROUND

In today's wireless communication networks, user devices such as electronic book readers, cellular telephones, personal digital assistants (PDAs), portable media players, tablet computers and netbooks typically have to search for cells when they are powered on. A cell belongs to a public land mobile network (PLMN) that provides land mobile telecommunications service to user devices. Generally, each service provider operates its own PLMN.

When a user device is powered on, the user device typically first looks for a PLMN on which the user device was last registered in the frequency band of a cell on which the user device was previously camped. If the last registered PLMN is not found in this frequency band, the user device searches for the last registered PLMN in other frequency bands supported by this PLMN. If that search is unsuccessful or there is no history of the last registered PLMN, the user device searches for the home or higher priority PLMN in frequency bands supported by the home PLMN. If the home or higher priority PLMN is not found, the user device searches on all frequency bands supported by the user device, and selects a PLMN that has the highest priority in a PLMN list on the SIM card or non-volatile memory of the user device.

The above procedure works well when a user device is powered on in an area serviced by its last registered PLMN or its home PLMN. However, when a user device is powered on at a location where the last registered PLMN or home PLMN are not available, the above procedure causes a significant delay in acquiring wireless service by the user device because the user device has to exhaust its search for the last registered and home PLMN before camping on a new PLMN.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for reducing service acquisition time of a user device are disclosed. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity.

When a user attempts to turn off a user device, the user device provides data pertaining to a future destination of the user device to a server. Upon receiving network information for the future destination from the server, the user device stores the network information for the future destination in a local store of the user device, and powers off the user device. Subsequently, at power-on, the user device searches for an available network using network information in the local store. The use of the network information allows the user device to search for a roaming network without first searching for a last registered network and/or home network. As a result, the service acquisition time of the user device is significantly reduced.

Figure 1:
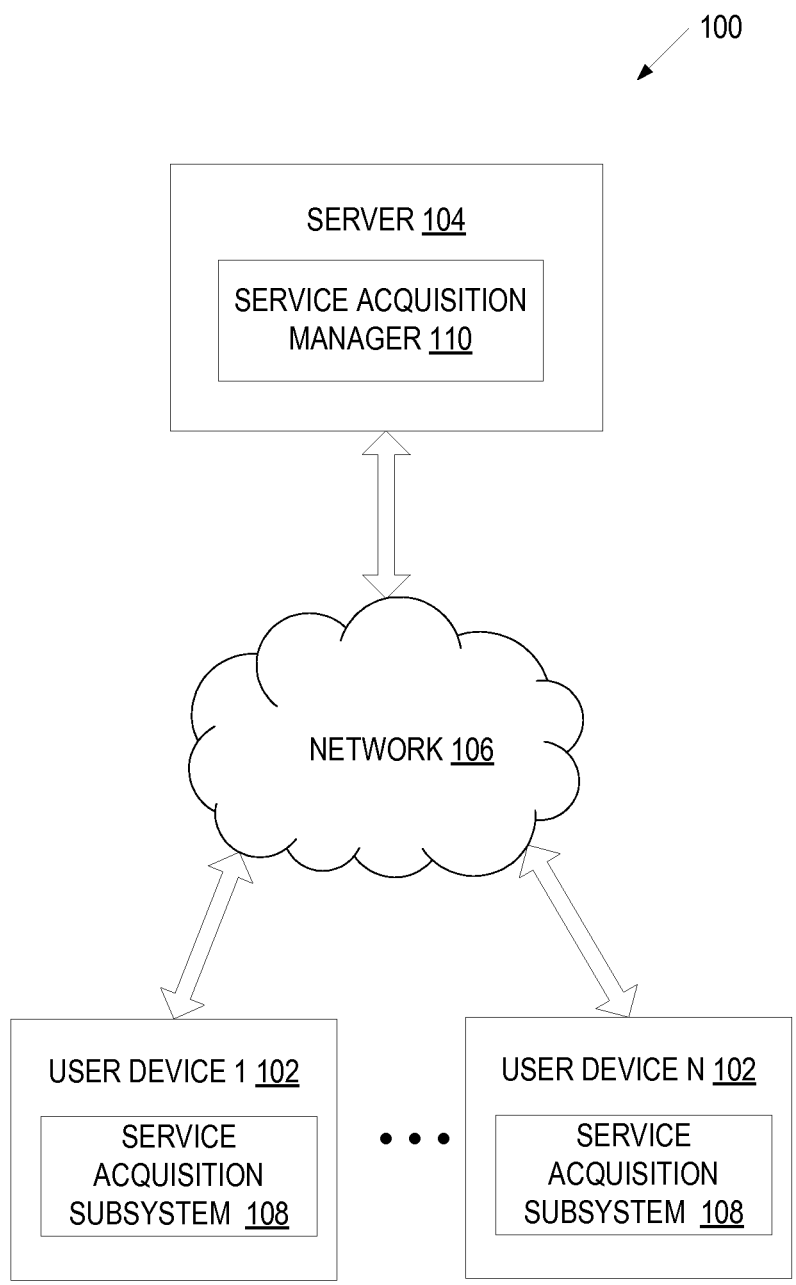
FIG. 1 is a block diagram of an exemplary network architecture in which embodiments of the invention may operate.

FIG. 1 is a block diagram of exemplary network architecture 100 in which embodiments of the invention may operate. The network architecture 100 may include a server 104 and multiple user devices 102 coupled to the server 104 via a network 106 (e.g., public network such as the Internet, private network such as a local area network (LAN) or an operator network).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a network-based server (also referred to as a cloud server), a network operator (service provider) server, a content provider server, an access point provider server, or any other server that provides various services to user devices 102 via the network 106. In one embodiment, the server 104 downloads items, upgrades, and/or other information to the user devices 102 via the network 106. The server 104 also receives various requests, instructions and other data from the user devices 102 via the network 106. The server 104 may include one or more machines (e.g., one or more server computer systems, routers, gateways) that have processing and storage capabilities to provide the above functionality.

Communication between the server 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the server 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., a WI-FI™ wireless local area network (WLAN)_access point) provider system.

The communication infrastructure may also include a communication-enabling system that serves as an intermediary in passing information between the server 104 and the wireless network operator. The communication-enabling system may communicate with the wireless network operator via a dedicated channel, and may communicate with the server 104 via a non-dedicated communication mechanism, e.g., a public network such as the Internet.

The server 104 may pay the network operator a fee based on the aggregate use of the network operator system by all of the user devices 102. The server 104 may recoup these costs through fees charged to the end-users separately or as part of other purchases (e.g., purchase of digital content) made by the end-users. Alternatively, the network operator may submit bills directly to individual users, or may submits bills to either the server 104 (in aggregate) or to the individual users, at the option of the individual respective users.

A user device 102 may be associated with a specific network operator (home network operator) by means of a subscriber identity module (SIM) card. A SIM card may include predefined lists of preferred wireless networks (e.g., PLMNs) that a user device 102 should use when acquiring service outside of the area covered by its home network operator. The entries and prioritization in the lists are usually based on agreements contracted among the various network operators. Alternatively, a user device 102 may be associated with a home network operator based on data stored in memory (e.g., non-volatile memory), and predefined lists of preferred wireless networks (e.g., PLMNs) may also be stored in memory of the user device.

When a user device 102 is powered on, the user device 102 first searches for a last registered PLMN, and then for its home PLMN. If the home PLMN is not found, then the user device 102 searches on all frequency bands supported by the user device 102 for available roaming PLMNs, and selects a roaming PLMN that has the highest priority according to the preferred PLMN list. The above procedure causes a significant delay in acquiring wireless service by the user device 102 if the user device 102 is powered on at a location where the last registered PLMN and home PLMN are not available. For example, users traveling in flight from the U.S. to Europe are likely to notice a significant delay in service acquisition when powering on their user devices in Europe for the first time.

Embodiments of the invention avoid the above limitation by obtaining network information for a future destination of the user device 102 and storing this network information in a local store (e.g., in non-volatile memory) of the user device 102 before the user device is powered off. In particular, the user device 102 may host a service acquisition subsystem 108 that identifies a user attempt to turn off the user device 102, and provides data pertaining to a future destination of the user device 102 to the server 104. The data may include, for example, destination information (e.g., destination airport, city and/or country) specified by the user when prompted by the service acquisition subsystem 108 in response to the user attempt to turn off the user device 102, or destination information determined when the user scans his or her boarding pass using a scanner contained in the user device 102. Alternatively, the data provided by the service acquisition subsystem 108 to the server 104 may identify current location (e.g., current GPS coordinates) of the user device 102. The GPS coordinates can be used to identify the airport gate where the user device 102 is located, which can then be used to determine the flight number and the future destination of the user device 102. Yet alternatively, the user device 102 may not provide data pertaining to a future destination of the user device 102 to the server 104. Rather the server 104 may determine the future destination of the user device 102 via an external service (e.g., a travel reservation service, a payment processing service, and the like) or via similar means.

The service acquisition subsystem 108 may then receive network information for the future destination of the user device 102 from the server 104, store the network information for the future destination in a local store, and power off the user device 102. The network information may specify one or more roaming PLMNs, frequency bands, frequencies, cell identifiers and radio access technologies (RATs) available at the future destination of the user device 102, or any combination of the above data. Alternatively, the network information may only include instructions to refrain from searching for a last registered PLMN or home PLMN when the user device 102 is powered on next time. Subsequently, at power-on, the service acquisition subsystem 108 uses the network information in the local store when performing a PLMN scan. For example, depending on the network information, the service acquisition subsystem 108 may simply skip searching for the last registered PLMN or home PLMN, or it may not only skip searching for the last registered PLMN or home PLMN but also look for a particular roaming PLMN, band, frequency, cell and/or RAT. In addition, depending on the network information, the service acquisition subsystem 108 may skip searching for specific bands when performing a PLMN scan. For example, the network information may indicate that Europe does not support UMTS (universal mobile telecommunication system) band2 and band5, and the service acquisition subsystem 108 may skip searching for UMTS band2 and band5 during a PLMN scan at power up of the user device 102 in Europe.

When the user device 102 connects to (camps on) a roaming PLMN, the service acquisition subsystem 108 may send network information associated with the roaming PLMN to the server 104. This network information may include current GPS coordinates, PLMN, band, frequency, cell identifier and RAT.

In one embodiment, the server 104 hosts a service acquisition manager 110 that receives a user device power-off message including data pertaining to a future destination of the user device 102, searches a centralized data store for network information corresponding to the future destination, and provides the found network information to the user device 102. In addition, the service acquisition manager 110 may receive current network information of various user devices 102 and store the received network information in the centralized data store.

Figure 2:
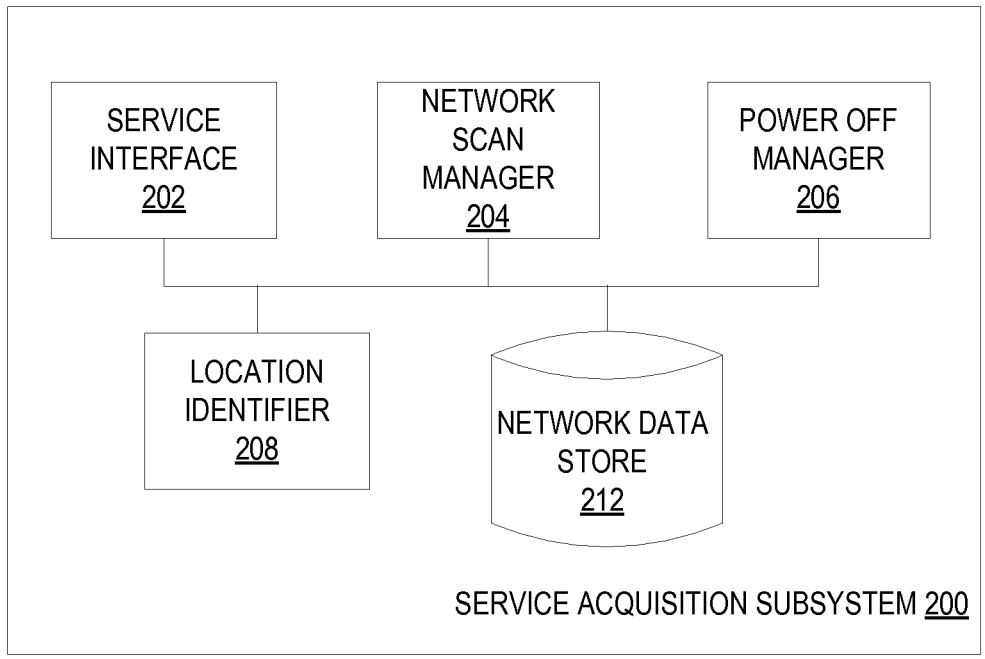
FIG. 2 is a block diagram of one embodiment of a service acquisition subsystem.

FIG. 2 is a block diagram of one embodiment of a service acquisition subsystem 200 hosted by a user device. The service acquisition subsystem 200 may be the same as service acquisition subsystem 108 of FIG. 1 and may include a server interface 202, a network scan manager 204, a power off manager 206, a location identifier 208, and network data store 212. The components of the service acquisition subsystem 200 may represent modules that can be combined together or separated into further modules, according to some embodiments.

The power off manager 206 identifies a user attempt to turn off the user device and determines whether the user device is likely to be powered on at a different location next time. The power off manager 206 may make this determination by, for example, invoking the location identifier 208 to obtain current location data (e.g., GPS coordinates) of the user device and deciding whether the current location data indicates that the user device is currently located at an airport, a train station, and the like. If so, the power off manager 206 may prompt the user to identify his or her destination airport, destination city or destination country and provide this data to the server via the server interface 202. In another embodiment, the power off manager 206 does not prompt the user for destination data but rather provides the current GPS coordinates to the server via the server interface 202. In yet another embodiment, the power off manager 206 searches local storage media of the user device for destination data and provides this destination data to the server via the server interface 202. For example, the power off manager 206 may search the user calendar for user flight or destination data, or it may search user email or text messages for flight or destination information. In still another embodiment, the power off manager 206 prompts the user to scan his or her boarding pass to obtain the destination data and provides the destination data to the server via the server interface 202.

Upon providing the above data to the server, the service interface 202 waits for a server response. If the server response is not received within a predefined time interval or the server response indicates that corresponding network information is not available, the power off manager 206 powers off the user device. If the server response includes network information for a future destination of the user device, the server interface 202 stores the network information for the future destination in the network data store 212, and the power off manager 206 powers off the user device. The network information may specify one or more roaming PLMNs, frequency bands, frequencies, cell identifiers and radio access technologies (RATs) available at the future destination of the user device, or any combination of the above data. Alternatively, the network information may only include instructions to refrain from searching for a last registered PLMN or home PLMN when the user device is powered on next time. The network data store 212 may represent a single data structure or multiple data structures (tables, databases, repositories, files, etc.) residing on one or more mass storage devices, such as magnetic or optical storage based disks, solid-state drives or hard drives.

At power-on, the network scan manager 204 accesses the network data store 212 to see if it includes destination network information. If not, the network scan manager 204 begins a PLMN scan by first searching for the last registered PLMN and/or home or higher priority PLMN. If the network data store 212 includes the destination network information, the network scan manager 204 uses this information when performing a PLMN scan. For example, depending on the network information, the network scan manager 204 may skip searching for the last registered PLMN and/or home or higher priority PLMN, or it may not only skip searching for the last registered PLMN and/or home or higher priority PLMN but also look for a particular roaming PLMN, band, frequency, cell and/or RAT. In addition, the network scan manager 204 may skip searching for specific bands or for particular radio access technologies (RATs) (e.g., it may skip searching for GSM when performing a PLMN scan at power up of the user device in Japan).

When the user device camps on a roaming PLMN, the service interface 202 sends network information associated with the roaming PLMN to the server. This network information may include, for example, current GPS coordinates or an airport code at the current location of the user device, PLMN, band, frequency, cell identifier and RAT.

In one embodiment, the above functionality of the service acquisition subsystem 200 is automatically enabled when it is determined based on location data (e.g., GPS coordinates) that the user device being powered off is located at an airport. Alternatively or in addition, the above functionality of the service acquisition subsystem 200 may be enabled upon a user request. For example, a user driving across different European countries may request this functionality to reduce service acquisition time at the final destination.

Figure 3:
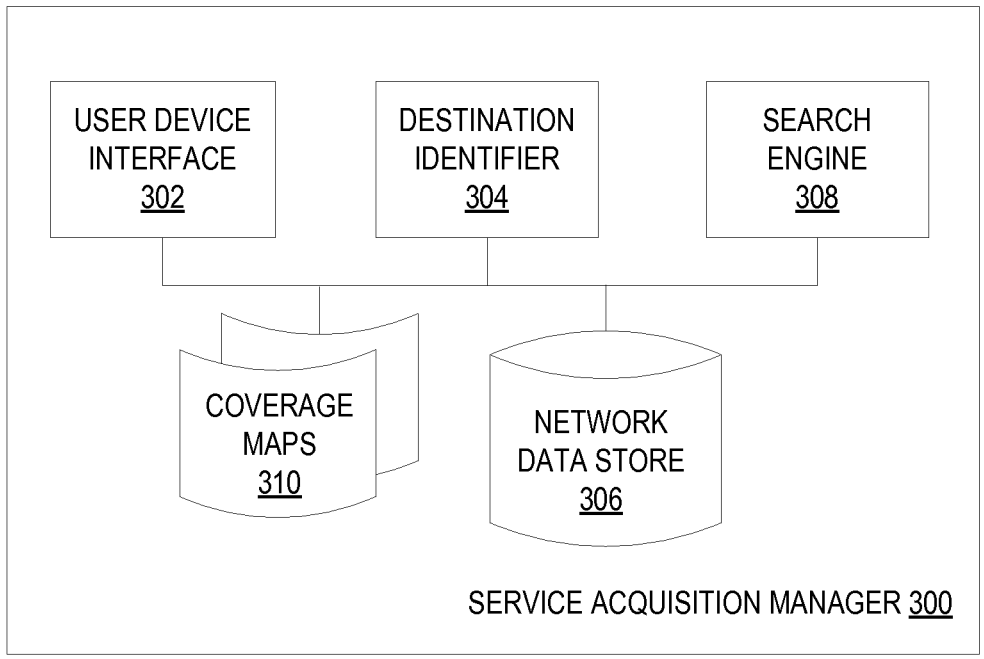
FIG. 3 is a block diagram of one embodiment of a service acquisition manager.

FIG. 3 is a block diagram of one embodiment of a service acquisition manager 300 hosted by a server. The service acquisition manager 300 may be the same as service acquisition manager 110 of FIG. 1. The service acquisition manager 300 may include a user device interface 302, a destination identifier 304, a search engine 308, and a centralized network data store 306. The components of the service acquisition manager 300 may represent modules that can be combined together or separated into further modules, according to some embodiments.

The user device interface 302 receives messages of various user devices and determines the type of each user device message. A user device message may be, for example, a powering off message that includes destination data, a powering off message that includes current location data of the user device but not destination data, or a powered on message that includes roaming network information. If a user device message is a powering off message that includes location data (e.g., GPS coordinates or airport code) of a user device, the destination identifier 304 uses the GPS coordinates to identify the airport gate where the user device is presently located. Based on the gate number and the current date/time information, the destination identifier 304 may then determine flight and destination data. In one embodiment, if the destination identifier 304 is unable to identify destination data based on the GPS coordinates, the user device interface 302 responds to the requesting user device, indicating that it is unable to determine the destination of the user device. In another embodiment, if the destination identifier 304 is unable to identify destination data, the destination identifier 304 requests destination data from one or more external services (e.g., a travel reservation service, a payment processing service, etc.).

When destination data is available (e.g., included in a powering off message of a user device or determined by the destination identifier 304), the search engine 308 searches the network data store 306 for roaming network information corresponding to the destination data. If roaming network information corresponding to the destination data is not found, the user device interface 302 responds to the requesting user device, indicating that it is unable to determine roaming network information for the future destination of the user device. If roaming network information corresponding to the destination data is found, the user device interface 302 provides the roaming network information to the requesting user device. The roaming network information may include one or more roaming PLMNs, bands, frequencies, cell identifiers, and/or RATs available at the future destination of the user device.

If a user device message is a powered on message that includes network information, the user device interface 302 stores the network information in the network data store 306. The network information may include location data (e.g., GPS coordinates) together with PLMN, band, frequency, cell identifier and/or RAT at the current location of the user device. In addition, the network information may include a timestamp, which can be used, for example, to eliminate old records or prioritize the records in the network data store 306.

The network data store 306 may be populated using network information received from various user devices and/or coverage maps 310 received from various network operators. A record in the network data store 306 may include location data and corresponding network information, which may provide partial or full details about a PLMN available at a specific location or it may identify PLMNs that are not available at a specific location. With many user devices providing network information, the network data store 306 is able to cover various airports around the world, and allow for significant reduction of service acquisition times of various user devices. The network data store 306 may represent a single data structure or multiple data structures (tables, databases, repositories, files, etc.) residing on one or more mass storage devices, such as magnetic or optical storage based disks, solid-state drives or hard drives.

Figure 4:
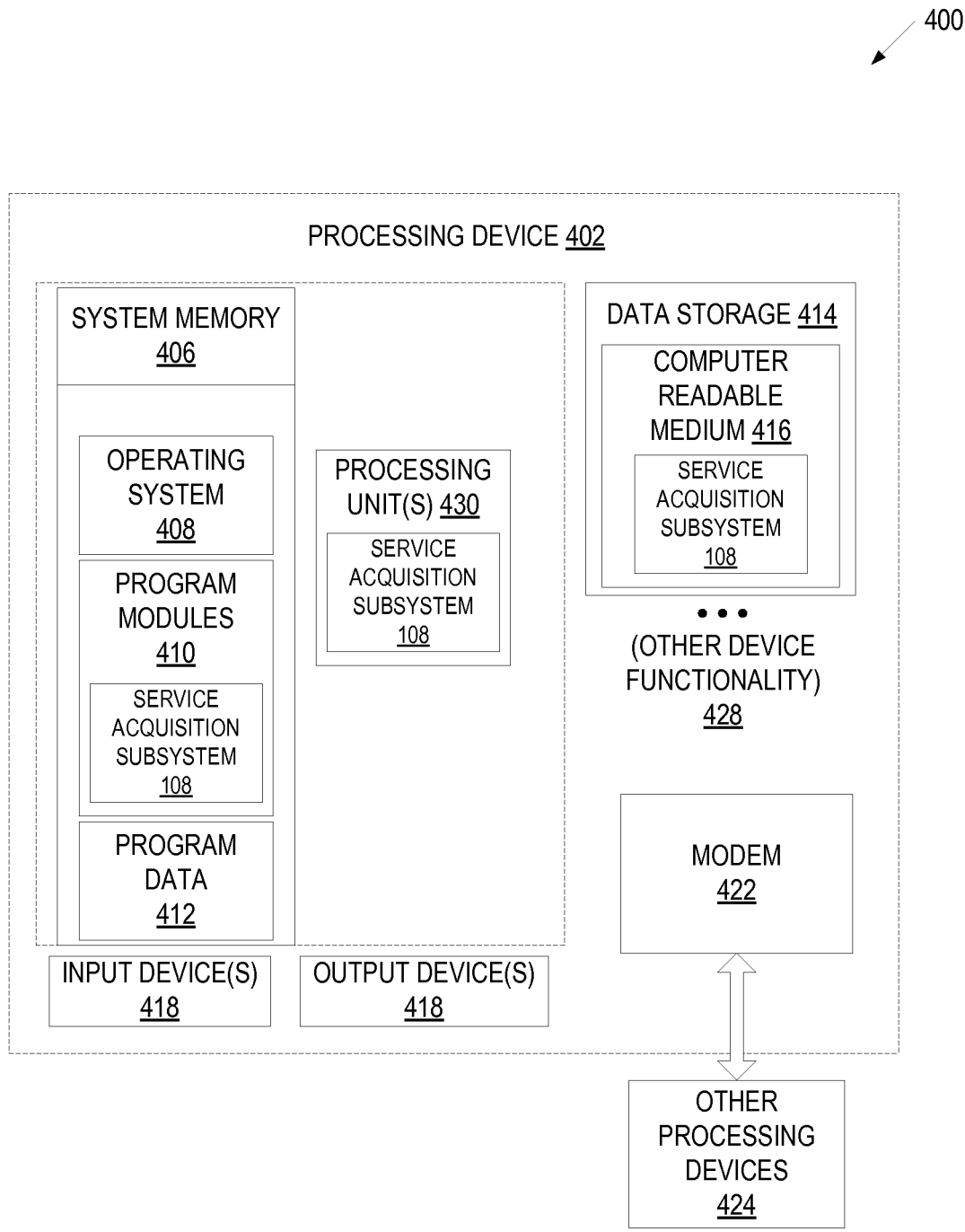
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including cell search optimization subsystem 108, program data 412, and/or other components. The user device 400 performs functions by using the processing unit(s) 404 to execute the preferred network subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the cell search optimization subsystem 108) embodying any one or more of the methodologies or functions described herein. As shown, instructions of the cell search optimization subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the cell search optimization subsystem 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the server 104, and so forth. The wireless modem 422 may allow the user device 400 to receive a voice call and also communicate with the server 104 in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WI-FI, long term evaluation (LTE) and WIMAX™.

The above-enumerated list of modules is representative and is not exhaustive of the types of functions performed by the user device 400. As indicated by the label "Other Device Functionality" 428, the user device 400 may include additional functions.

Figure 5:
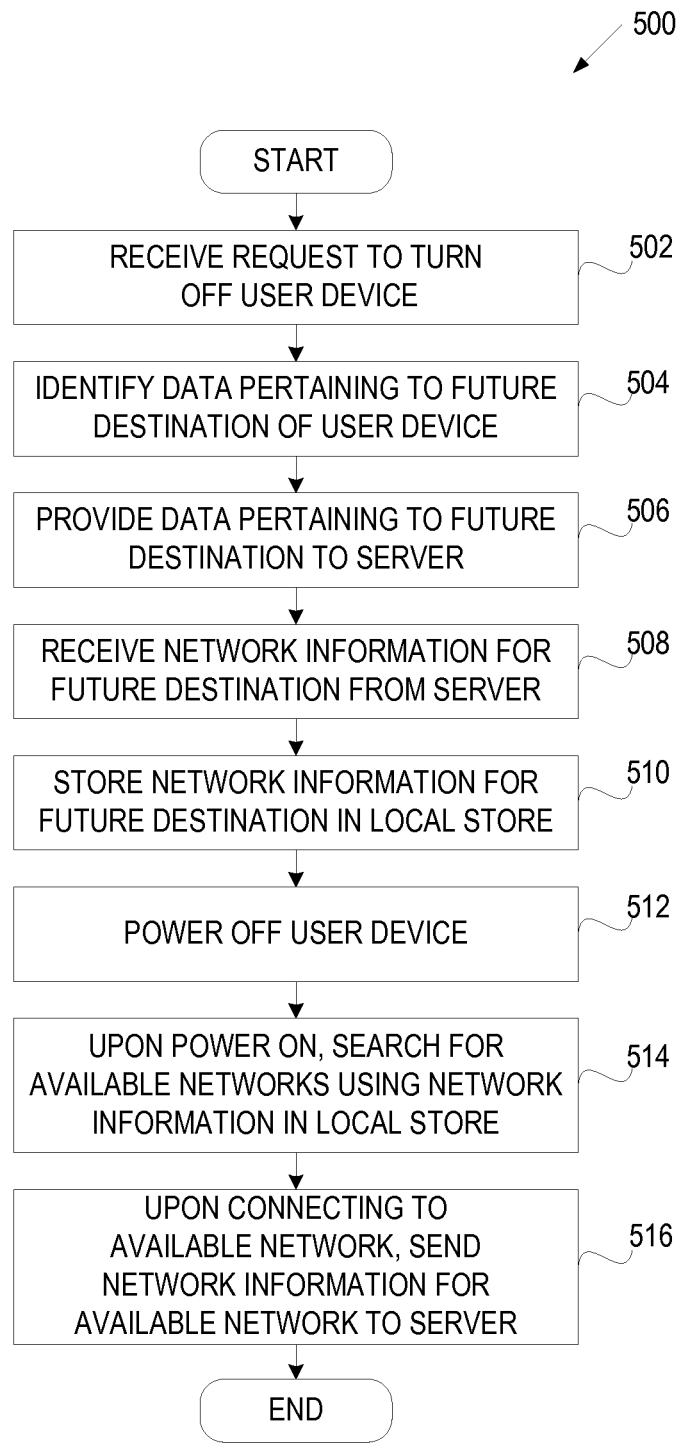
FIG. 5 is a flow diagram of one embodiment of a client-side method for reducing service acquisition time of a user device.
Figure 6:
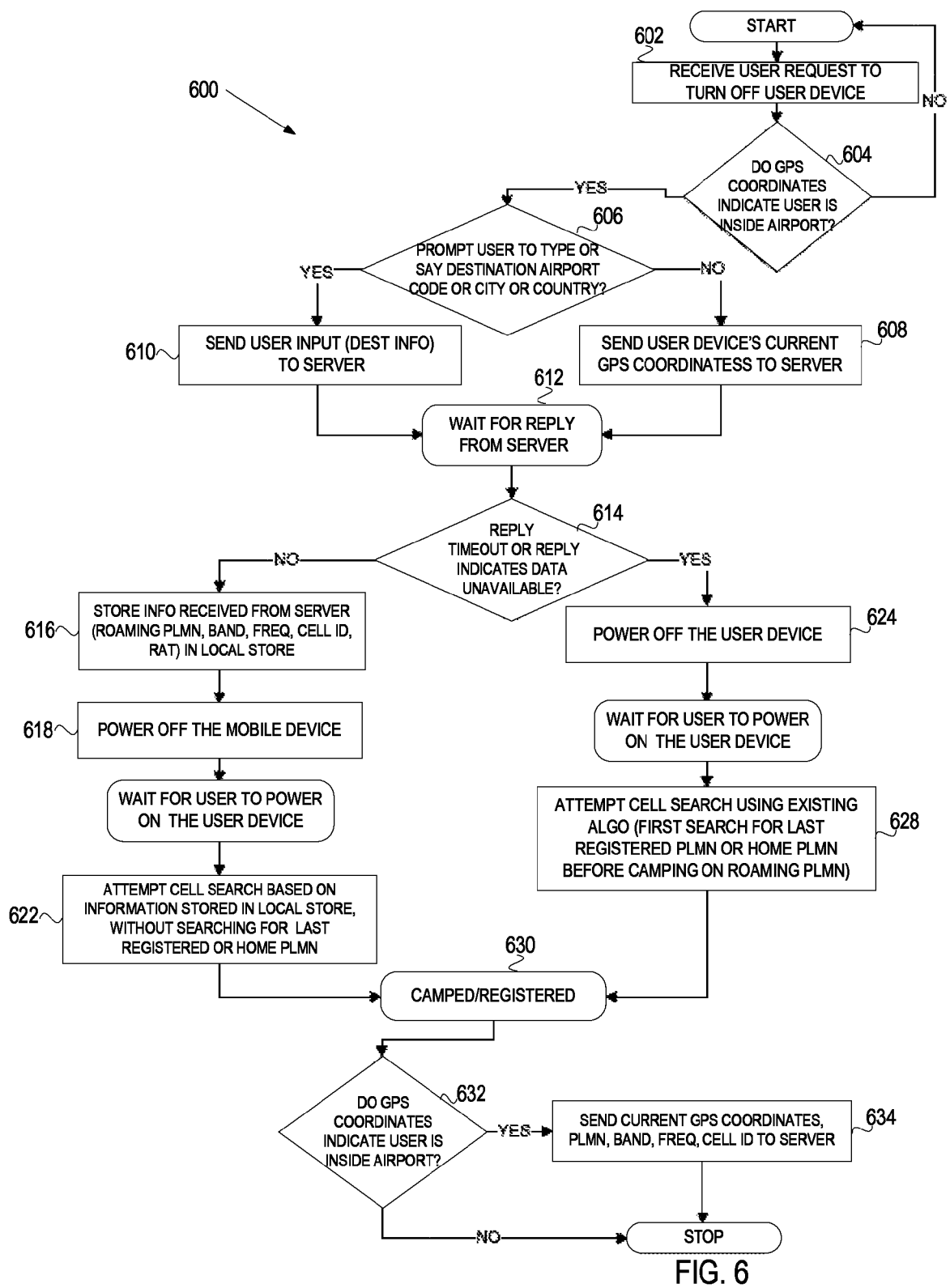
FIG. 6 is a flow diagram of another embodiment of a client-side method for reducing service acquisition time of a user device.

FIGS. 5 and 6 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a service acquisition subsystem 108 of user device 102 of FIG. 1).

FIG. 5 is a flow diagram of one embodiment of a method 500 for reducing service acquisition time of a user device. At block 502, the user device receives a request to turn off the user device. In one embodiment, upon receiving this request, the user device determines whether the user is likely to be at a different location when the user device is powered on next time. This determination can be made by deciding whether current location data (e.g., GPS coordinates) of the user device indicates that the user device is located at an airport, a train station, and the like.

At block 504, the user device identifies data pertaining to a future destination of the user device. This data may be a destination airport code, a destination country or a destination city specified by the user. Alternatively, this data may be current GPS coordinates of the user device. Yet alternatively, this data may identify the destination of the user device and may be obtained by searching a user calendar, user text or email messages, or the like.

At block 506, the user device provides the data pertaining to the future destination of the user device to the server. At block 508, the user device receives network information for the future destination from the server. The network information may identify one or more roaming networks, frequency bands, frequencies, cell identifiers and/or RATs available at the destination location. The network information may include all or some of these data. Alternatively, the network information may only include instructions to skip searching for a last registered network and/or home network when the user device is powered on next time.

At block 510, the user device stores the network information for the destination of the user device in a local data store. At block 512, the user device is powered off.

Subsequently, at power on, the user device searches for available networks using the network information in the local data store (block 514). In particular, the user device does not search for the last registered network and/or home network but rather searches for any available roaming network, or for a particular roaming network, or for any combination of a band, frequency, cell identifier and RAT.

At block 516, the user device connects to a found roaming network, and sends information for this roaming network to the server. The information may include, for example, current location data, network, band, frequency, cell identifier and RAT.

FIG. 6 is a flow diagram of another embodiment of a method 600 for reducing service acquisition time of a user device. At block 602, the user device receives a user request to turn off the user device. At block 604, the user device determines whether current GPS coordinates of the user device indicate that the user is inside the airport. If not, method 600 returns to block 602. If so, the user device determines whether the user should be prompted to provide destination data such as a destination airport code, city or country (block 606). It should be noted that block 604 may be optional, and the user may always be asked to provide destination data in the user interface at power-off.

If the user is prompted to provide destination data, the user device sends destination data provided by the user to a server (block 610), and waits for a server reply (block 612). Otherwise, the user device sends current GPS coordinates of the user device to the server (block 608) and waits for the server reply (block 612).

If the server reply is not received within a predefined time period or the server reply indicates that requested data is unavailable (block 614), the user device is powered off (block 624). Subsequently, at power-on, the user device attempts a cell search using an existing procedure that involves searching for the last registered PLMN and/or home PLMN before camping on a roaming PLMN (block 628).

If the server reply includes roaming network information, the user device stores the roaming network information (roaming PLMN, band, frequency, cell identifier and/or RAT) in a local data store (616), and the user device is powered off (block 624). Subsequently, at power-on, the user device attempts a cell search based on roaming network information stored in the local data store without searching for a last registered PLMN or home PLMN (block 622).

Once the user device is camped on a roaming network (block 630), the user device determines whether its current GPS coordinates indicate that the user device is located at an airport (block 632). If not, method 600 ends. If so, the user device sends its current GPS coordinates as well as its current roaming network information (PLMN, band, frequency, cell identifier, RAT) to the server (block 634) and method 600 ends.

It should be noted that in some embodiments, the user device does not communicate with the server to request network information for a future destination but rather stores network information in the local store and uses it at power up. For example, the user device may store network information in the local store each time the user device is at an airport, and then search the local store for network information next time the user device is powered up at an airport. If the user device finds network information corresponding to this airport, the user device uses the found network information when performing a PLMN search as discussed above. Alternatively, network information corresponding to various destinations may be stored in non-volatile memory of the user device during manufacturing and/or periodically obtained from the server. In yet another embodiment, the user device may still communicate with the server to request network information for a future destination but may use network information in the local store if the requested information is not received from the server (e.g., if the server is temporarily unavailable or connection with the server is broken).

Figure 7:
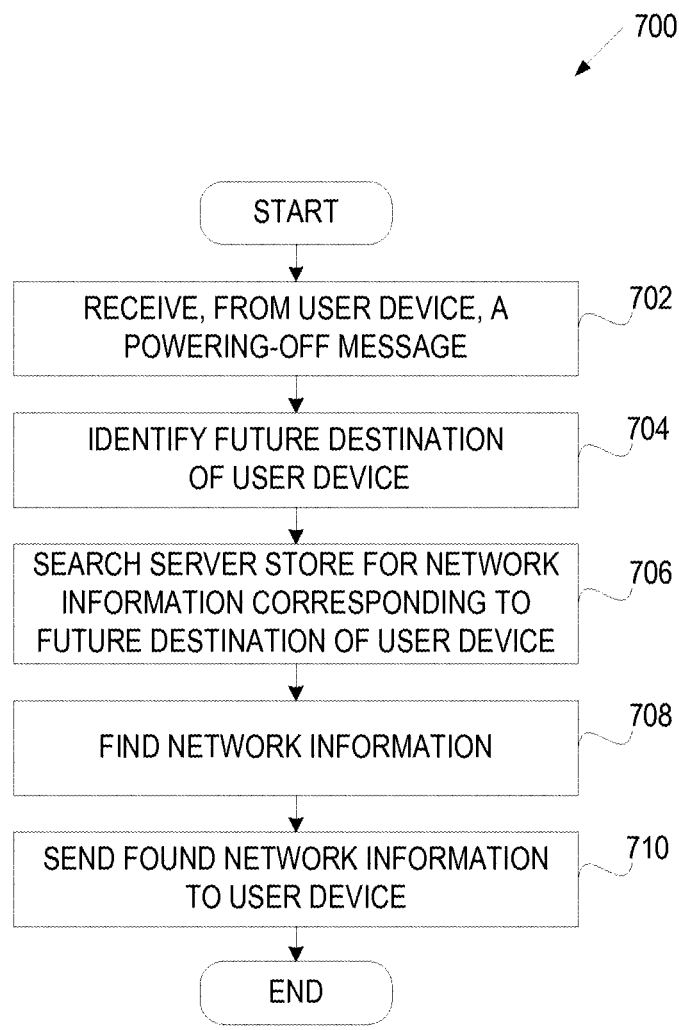
FIG. 7 is a flow diagram of one embodiment of a server-side method for facilitating reduced service acquisition time of a user device.
Figure 8:
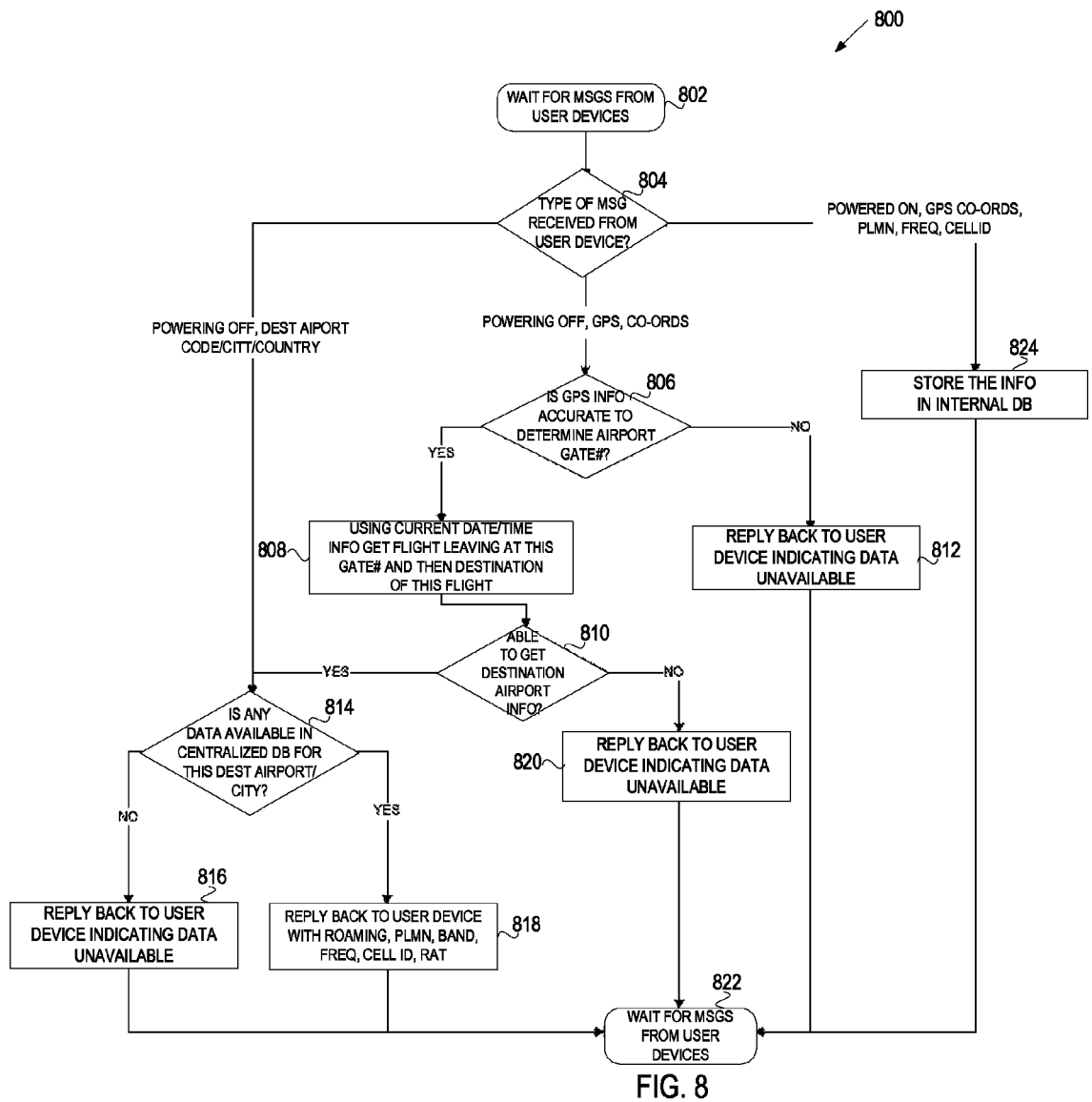
FIG. 8 is a flow diagram of another embodiment of a server-side method for facilitating reduced service acquisition time of a user device.

FIGS. 7 and 8 are flow diagrams of some embodiments of server-side methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a server (e.g., a service acquisition manager 110 of server 104 of FIG. 1).

FIG. 7 is a flow diagram of one embodiment of a server-side method 700 for facilitating reduced service acquisition time of a user device. At block 702, a server receives a powering-off message of the user device. The powering-off message may indicate that the user device is requested to be powered off. In addition, the powering off message may identify a future destination of the user device or may include current location data (e.g., current GPS coordinates) of the user device.

At block 704, the server identifies the future destination of the user device based on the destination data included in the message, or by determining the current gate number based on the location data included in the message and then determining the flight and destination based on the gate number and current date and time. Alternatively, the server may identify the destination of the user device by requesting it from an external service (e.g., a travel reservation service, a payment processing service, etc.).

At block 706, the server searches a centralized data store for network information corresponding to the future destination of the user device. The server may use timestamp data to prioritize records found during the search and/or delete old records from the centralized data store. Upon finding the corresponding network information (block 708), the server sends the corresponding network information to the user device. The corresponding network information may include full or partial data for one or more roaming networks available at the destination. Alternatively, the corresponding network information may include instructions not to search for a last registered network and/or home network if the last registered network and/or home network is not available at the destination.

FIG. 8 is a flow diagram of another embodiment of a server-side method 800 for facilitating reduced service acquisition time of a user device. At block 802, the sever waits for messages from various user devices. At block 804, the server receives a user device message and determines the type of the received message. If the received message is a powering-off message that includes destination data (e.g., a destination airport code, city and/or country), method 800 proceeds to block 814.

If the received message is a powering-off message that includes GPS coordinates, the server determines whether it can obtain the airport gate number using the GPS coordinates (block 806). If not, the server replies to the user device indicating that the requested data is unavailable (block 812), and method 800 proceeds to block 822 where the server waits for messages from user devices. If the server can obtain the airport gate number using the GPS coordinates, the server attempts to identify a corresponding flight and destination based on the airport gate number and the current date and time (block 808). If the sever is unable to identify the destination airport information (block 810), the server replies to the user device indicating that the requested data is unavailable (block 820), and method 800 proceeds to block 822 where the server waits for messages from user devices. If the server is able to identify the destination airport information, method 800 proceeds to block 814.

At block 814, the server determines whether a centralized database includes data for the destination airport, city and/or country. If not, the server replies to the user device indicating that the requested data is unavailable (block 816), and method 800 proceeds to block 822. If so, the server replies to the user device with roaming network information (roaming PLMN, band, frequency, cell identifier, RAT) for the destination location (block 818), and method 800 proceeds to block 822.

If the server determines at block 804 that the received message is a powered-on message that includes current network information, the server stores the current network information in the centralized data store (block 824), and method 800 proceeds to block 822. The current network information may include, for example, current GPS coordinates, PLMN, band, frequency, cell identifier and RAT.

Figure 9:
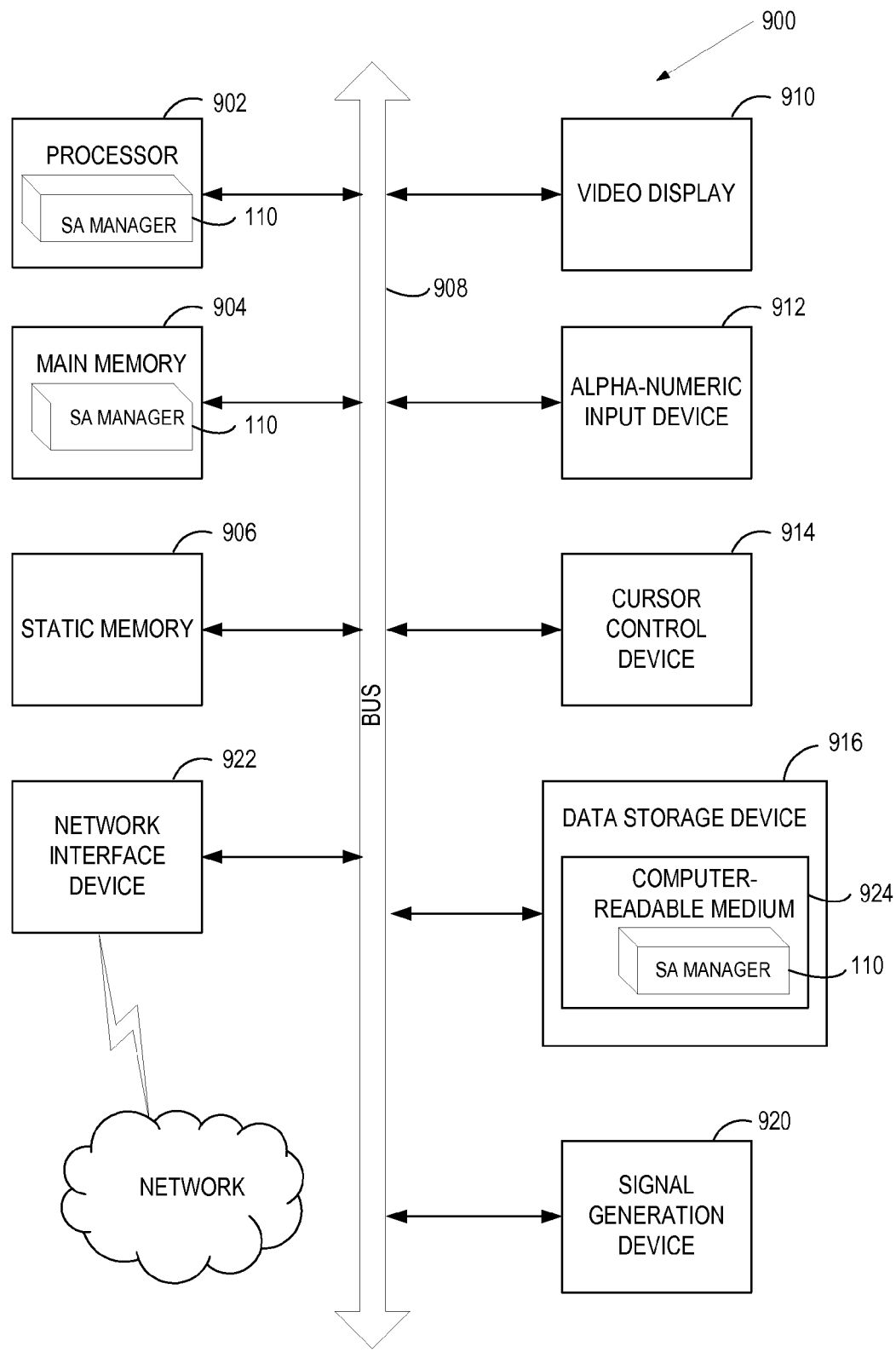
FIG. 9 illustrates an exemplary server facilitating reduced service acquisition time of a user device.

FIG. 9 illustrates an exemplary server 900 that facilitates reduced service acquisition times of user devices. The server 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 906.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the service acquisition (SA) manager 110 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions (e.g., instructions of service acquisition manager 110) embodying any one or more of the methodologies or functions described herein. The service acquisition manager 110 may also reside, completely or at least partially, within the main memory 904 and/or within the processor 902 during execution thereof by the computer system 900, the main memory 904 and the processor 902 also constituting computer-readable media. The service acquisition manager 110 may further be transmitted or received over a network 920 via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a user device, network information for a future destination of the user device;
   storing, by the user device, the network information for the future destination in a local store of the user device; and
   responsive to the user device starting up, searching, by the user device, for an available network using the network information in the local store of the user device, wherein searching for the available network excludes searching for a last registered network.

2. The method of claim 1, further comprising:
   prompting a user to specify the future destination; and
   sending an identification of the future destination to a server, wherein the network information is received from the server responsive to sending the identification of the future destination to the server.

3. The method of claim 1, further comprising:
   identifying a current location of the user device; and
   sending an identification of the current location of the user device to a server, wherein the network information is received from the server responsive to sending the identification of the current destination to the server.

4. The method of claim 1, further comprising:
   obtaining data pertaining to the future destination of the user device from at least one of a boarding pass, calendar information, or an electronic message; and
   providing the data to a server, wherein the network information is received from the server responsive to sending the data.

5. The method of claim 1, further comprising:
   determining GPS coordinates of the user device, the GPS coordinates corresponding to a transport facility location; and
   transmitting the GPS coordinates to a server, wherein the network information is received from the server responsive to sending the GPS coordinates to the server.

6. The method of claim 1, further comprising:
   receiving a request to at least partially power down the user device;
   sending data pertaining to the future destination of the user device to a server responsive to receiving the request, wherein the network information is received after sending the data; and
   at least partially powering down the user device after storing the network information.

7. The method of claim 1, wherein the network information for the future destination identifies at least one of a roaming network available at the future destination, a frequency band, a frequency, a cell identifier, or a radio access technology (RAT).

8. The method of claim 1, wherein searching for the available network further excludes searching for at least one of a home network, a higher priority network, one or more bands, one or more frequencies, or one or more radio access technologies.

9. A non-transitory computer readable storage medium comprising instructions that, when executed by a processing device of a user device, cause the processing device to perform operations comprising:
   receiving, by the processing device, network information for a future destination of the user device;
   storing, by the processing device, the network information for the future destination in a local store of the user device; and
   responsive to the user device starting up, searching for an available network using the network information in the local store of the user device, wherein searching for the available network excludes searching for a last registered network.

10. The non-transitory computer readable storage medium of claim 9, the operations further comprising:
    prompting a user to specify the future destination; and
    sending an identification of the future destination to a server, wherein the network information is received from the server responsive to sending the identification of the future destination to the server.

11. The non-transitory computer readable storage medium of claim 9, the operations further comprising:
    identifying a current location of the user device; and
    sending an identification of the current location of the user device to a server, wherein the network information is received from the server responsive to sending the identification of the current destination to the server.

12. The non-transitory computer readable storage medium of claim 9, the operations further comprising:
    obtaining data pertaining to the future destination of the user device from at least one of a boarding pass, calendar information, or an electronic message; and
    providing the data to a server, wherein the network information is received from the server responsive to sending the data.

13. The non-transitory computer readable storage medium of claim 9, the operations further comprising:
    determining GPS coordinates of the user device, the GPS coordinates corresponding to a transport facility location; and
    transmitting the GPS coordinates to a server, wherein the network information is received from the server responsive to sending the GPS coordinates to the server.

14. The non-transitory computer readable storage medium of claim 9, the operations further comprising:
    receiving a request to at least partially power down the user device;
    sending data pertaining to the future destination of the user device to a server responsive to receiving the request, wherein the network information is received after sending the data; and
    at least partially powering down the user device after storing the network information.

15. The non-transitory computer readable storage medium of claim 9, wherein the network information for the future destination identifies at least one of a roaming network available at the future destination, a frequency band, a frequency, a cell identifier, or a radio access technology (RAT).

16. The non-transitory computer readable storage medium of claim 9, wherein searching for the available network further excludes searching for at least one of a home network, a higher priority network, one or more bands, one or more frequencies, or one or more radio access technologies.

17. A user device comprising:
   a data store;
   a wireless modem; and
   a processing device coupled to the data store and to the wireless modem, the processing device to:
      receive network information for a future destination of the user device;
      store the network information for the future destination in the data store; and
      responsive to the user device starting up, search for an available network via the wireless modem using the network information, wherein the search for the available network excludes a search for a last registered network.

18. The user device of claim 17, the processing device further to:
   determine data pertaining to the future destination of the user device; and
   provide the data to a server, wherein the network information is received from the server responsive to sending the data.

19. The user device of claim 17, the wherein the processing device is further to:
   receive a request to at least partially power down the user device;
   send data pertaining to the future destination of the user device to a server responsive to receiving the request, wherein the network information is received after sending the data; and
   at least partially power down the user device after storing the network information.

20. The user device of claim 17, wherein the network information for the future destination identifies at least one of a roaming network available at the future destination, a frequency band, a frequency, a cell identifier, or a radio access technology (RAT).

* * * * *